July 10, 1951

J. W. GRAY 2,560,170

VOLTAGE DIVIDING CIRCUIT

Filed Nov. 3, 1948

Inventor
JOHN W. GRAY

By
H. S. Mackey
Attorney

Patented July 10, 1951

2,560,170

UNITED STATES PATENT OFFICE 2,560,170

VOLTAGE DIVIDING CIRCUIT

John W. Gray, White Plains, N. Y., assignor to General Precision Laboratory Incorporated, a corporation of New York Application November 3, 1948, Serial No. 58,139

8 Claims. (Cl. 250—27)

This invention relates to a voltage dividing circuit in which an alternating current voltage is divided by a unidirectional voltage yielding as a quotient a voltage of the same phase and waveshape as the alternating voltage. More specifically an electronic circuit is provided wherein the alternating voltage and the unidirectional voltage by which the alternating voltage is to be divided constitute the inputs and there is derived, without the use of moving parts, an output voltage which is directly proportional to the quotient of the input voltages.

In many applications such as for example computers, control devices and the like it is desirable to obtain the quotient of two functions which may be most easily derived as alternating and direct current voltages. Heretofore, however, the division of voltages has not be easily arrived at and has ordinarily involved the use of servo controls and relatively complicated arrangements to perform this basically simple operation.

It is the purpose of the present invention to provide a simple apparatus having no moving parts which will perform this operation with as great or greater accuracy as the more complicated apparatus previously used for this purpose.

In accomplishing this purpose the instant invention makes use of the fact that because of the nature of the distribution of initial velocities of electrons leaving a hot cathode, the current in a diode is an exponential function of the plate voltage, when the current is so small that the space charge does not create a surface of lower potential than the plate. A diode operated in this portion of its range is used as part of an attenuator for an alternating voltage which is to be divided by a unidirectional voltage, both the alternating and unidirectional voltages being impressed on the circuit as the input potentials thereof.

In providing a single such attenuator circuit some distortion in output is experienced due to the fact that the diode is operating on the exponential portion of its characteristic and to compensate and eliminate such distortional effects the invention contemplates the use of a pair of such attenuator circuits connected in balancing relation.

Additionally the instant invention contemplates the provision of means for amplifying the quotient output voltage by the use of high-mu triodes which perform the combined functions of diode exponential attenuator and triode amplifier, the grid thereof serving as both the diode plate and the control electrode for the triode amplifier.

The exact nature of the invention will be more fully appreciated from the following description when considered in connection with the attached drawings, in which.

Figure 1:
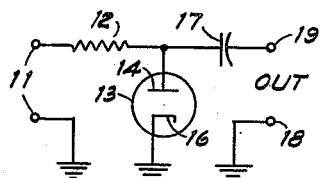
Figure 1 is a schematic diagram of the invention in its simplest form.

Referring now to the circuit of Fig. 1 the alternating current voltage and the direct current voltage by which it is to be divided are applied to the terminals 11 in any desired and known manner. Across these terminals there is connected a series network consisting of a high resistance 12 and a diode 13, the diode having its plate 14 connected to the resistance 12 and its cathode 16 connected to ground completing the circuit between terminals 11.

The output circuit for obtaining an alternating current voltage which is proportional to the quotient of the input voltages is connected across the diode 13, the lead connecting the terminal 19 with the plate 14 including a condenser 17 so that only alternating components of the voltages are impressed on the output terminals 18, 19.

In effect then the resistance 12 and diode 13 constitute an attenuator for the input voltages, a proportionate alternating current voltage being taken off at terminals 18 and 19 through the alternating current connection comprising the condenser 17. In the instant invention the diode 13 is operated in such a region of its characteristic curve that the resistance thereof varies in such a proper relationship as respects the direct current voltage as to perform the required division between the alternating and direct input voltages.

Electrons leave a hot cathode at various velocities and when the current flow between the hot cathode and an electrode adjacent thereto is so small that the space charge does not create a surface of lower potential than the potential on the adjacent electrode the number of electrons which have sufficient initial kinetic energy to reach the adjacent electrode will depend on the potential thereof. That is to say, when the potential of the electrode adjacent the cathode is low only the electrons which are ejected from the cathode at the highest velocities will be received thereby and produce a plate current, while as the potential of the adjacent electrode is increased the electrons which have been ejected at lower velocities will be received in proportion to their velocities of ejection and the relative potential of the adjacent electrode. The number of electrons ejected at any particular velocity follows Maxwell's distribution law decreasing in number exponentially at increased velocities. The current flowing between the hot cathode and adjacent electrode is therefore also an exponential function in the region of small currents, which has been both theoretically and experimentally determined to be expressed by the equation $$i_p = i_0 \epsilon^{\frac{11600}{T} e_p} \quad (1)$$

where $i_p$ is the current flowing between the cathode and adjacent electrode, T is the absolute temperature of the cathode, $e_p$ is the potential of the adjacent electrode, and $i_0$ is the value $i_p$ would have when $e_p$ is zero if the equation were still valid at this high a value ($i_0$ is also a function of T). See for example "Theory of Thermionic Vacuum Tubes," first edition, by Chaffee, pages 75 et seq.

Figure 4:
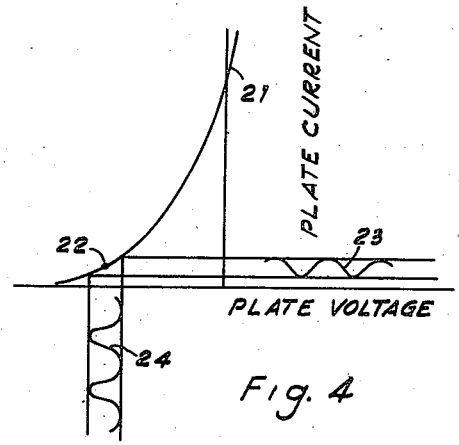
Figure 4 is a portion of the characteristic curve of a diode illustrating the principle of operation of the invention.

Assuming for simplicity, that the cathode is operated at a temperature of 887° C. or 1160° absolute (which is roughly typical for an oxide-coated cathode), Equation 1 may be written as $$i_p = i_0 \epsilon^{10 e_p} \quad (2)$$

and is graphically illustrated by the curve 21 of Fig. 4, the point 22 indicating the relationship between the plate voltage, $e_p$ and the plate current $i_p$ of the diode 13 at an average value as represented by the direct current voltage input impressed on the terminals 11 the current flow being limited by the resistance 12 which is made large as compared with the impedance of the diode. For example, where a diode of the type known as 6AL5 is used the resistance 12 having a resistance of 2.7 megohms has been used with very good results. Besides the impression of the direct current voltage there is also superimposed the alternating current voltage on the input as heretofore set forth which in producing a variation in the plate current in the diode produces a variational conductance therein which is expressed by the differential of the plate current with respect to the plate voltage, or as expressed as the differential of Equation 2 above.

$$\frac{di_p}{de_p} = 10 i_0 \epsilon^{10 e_p} \quad (3)$$

Substituting $i_p$ for its equivalent $i_0 \epsilon^{10 e_p}$ as determined by Equation 2 above Equation 3 simplifies to:

$$\frac{di_p}{de_p} = 10 i_p \quad (4)$$

In other words the variational conductance of the diode 13 is dependent on the average plate current $i_p$ which is also the direct current, $i_{dc}$ flowing therethrough and by the same token the variational resistance is the reciprocal of the right hand portion of Equation 4 or $$\frac{1}{10 i_{dc}}$$

Considering now the diode 13 as part of the attenuator for alternating current voltage the remainder of which comprises the resistance 12; the alternating voltage E obtained at the output terminals 18 and 19 through the blocking condenser 17 will be expressed by the equation $$E = \frac{R_d}{R + R_d} E_{ac} \quad (5)$$

$R_d$ being the impedance of the diode 13 and equal $$\frac{1}{10 i_{dc}}$$

R being the resistance of the resistor 12 and $E_{ac}$ the alternating current voltage input. If as has been heretofore stated the resistance R is much greater than the impedance of the diode the term $R_d$ in the denominator of Equation 5 may be neglected for all practical purposes and Equation 5 becomes:

$$E = \frac{R_d}{R} E_{ac} \quad (6)$$

or $$E = \frac{E_{ac}}{10 i_{dc} R} \quad (7)$$

Likewise if the direct current voltage input is large compared to the plate potential of the diode 13 the direct current flowing through the circuit will be dependent only on the direct current voltage and the resistance of resistor 12 so that $$i_{dc} = \frac{E_{dc}}{R} \quad (8)$$

Substituting this value of $i_{dc}$ in Equation 7 the expression $$E = \frac{E_{ac}}{10 E_{dc}} \quad (9)$$

is obtained, thereby establishing that under proper operating conditions as outlined heretofore the output voltage is proportional to the quotient of the alternating current input voltage divided by the direct current input voltage.

The simple circuit of Fig. 1 provides a division of an alternating current by a direct current voltage yielding an output consisting of an alternating current voltage which is of the same phase as the alternating current input voltage but the wave shape thereof is altered somewhat by reason of the fact that the variation in input extends over an exponential portion of the characteristic curve.

Referring to Fig. 4 if the variation in plate current is a true sine wave such as 23, the variation in plate potential and hence the output voltage will depart from a true sine wave by having the tops flattened and the bottoms peaked as indicated by the curve 24. In other words, even harmonic variations will be superimposed thereon.

Figure 2:
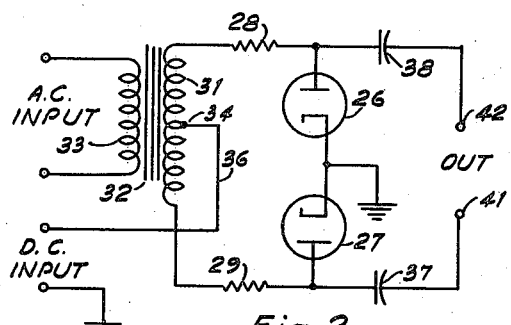
Figure 2 is a schematic diagram of modification of the invention providing a balanced output.

This error in wave shape while small for low outputs is corrected in the modified circuit of Fig. 2 so that larger output quotient voltages may be obtained without noticeable distortion.

In the circuit of Fig. 2 a pair of diodes 26 and 27 are connected in series with resistances 28 and 29 respectively, to provide two voltage divider circuits similar to the single divider circuit of Fig. 1. These two divider circuits are connected to opposite ends of the secondary 31 of a transformer 32 the primary 33 of which has impressed thereon the alternating current voltage which is to be divided. The secondary 31 is midtapped at 34 and the direct current voltage by which the alternating current voltage is to be divided is connected between this point through lead 36 and ground to which the cathodes of diodes 26 and 27 are also connected. The quotient output voltage is derived from the anodes of diodes 26 and 27 through condensers 37 and 38 providing at any instant of time a voltage output which is the difference of the instantaneous potentials of the diode plates.

In such an arrangement the effect of the nonlinearity of the characteristic curve is canceled to a large extent since the alternating current voltage is applied to the alternating circuits in opposite phase and hence when the voltage of output terminal 42 is positive and flattened that of output terminal 41 is negative and peaked and the difference of these two opposite wave distortions act to cancel each other. For example, referring to Fig. 5 if the solid curve 43 represents the potential of the terminal 41 whose waveform is flattened on the positive half-cycle and peaked on the negative half-cycle and the dotted line curve 44 represents the potential of terminal 42 which is of opposite phase to that of terminal 41 and also have a waveform which is flattened on the positive half-cycle and peaked on the negative half-cycle, the difference of these instantaneous potentials will be represented by the curve 45 which more nearly approaches a true undistorted sine wave. This results by reason of the fact that a distortion in one direction, i. e., a flattening is always opposed to and is counteracted by a distortion in the opposite direction, i. e., a peaking of the wave.

Figure 3:
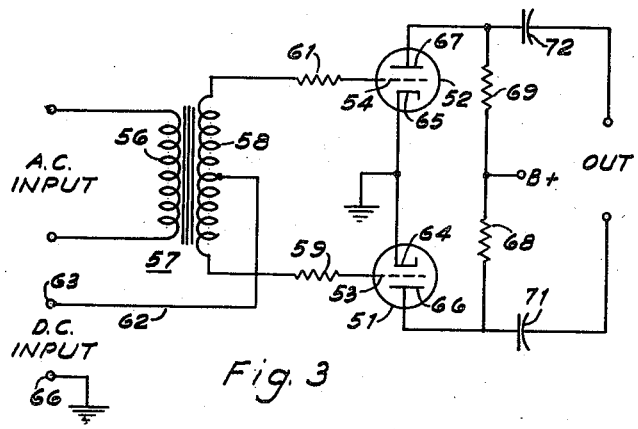
Figure 3 is a schematic diagram of a further modification of the invention incorporating amplifying means for the voltage output.

As an example, with the circuit just discussed using resistances of the values given with reference to Fig. 1 and the same type diode as there referred to, experiments have indicated that the output voltage may be as much as 100 millivolts r. m. s. with very little distortion. Computation indicates that there is no second harmonic, and that the relative amount of third harmonic varies as the square of the output, being only 5% of the fundamental at 100 millivolts.

Where larger output voltages are desired the modification disclosed in Fig. 3 is particularly advantageous. In this modification high-mu triodes 51 and 52 are used which function as the diodes forming part of the balanced attenuator circuits in the manner of the arrangement of Fig. 2 and as amplifiers for the outputs of the diodes, the grids 53 and 54 functioning at one and the same time as the diode anodes and as the control electrodes for the amplifiers.

The alternating current voltage which is to be divided by the unidirectional voltage is impressed on the primary 56 of a transformer 57, the secondary 58 of which is connected at its opposite ends to the grids 53 and 54 through respective high resistances 59 and 61. The unidirectional or divisor voltage is impressed on the grid-cathode portions of tubes 51 and 52 by a circuit which includes terminal 63, conductor 62 connected to the midtap of the secondary 58, grids 53 and 54, cathodes 64 and 65 returning to ground and terminal 66 connected thereto.

Figure 5:
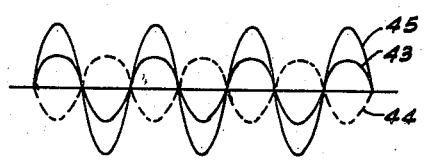
Figure 5 is a representation of the wave forms obtained from the balanced circuits of Figs. 2 and 3.

So much of the circuit functions in the same manner as the circuit of Fig. 2, the grids 53 and 54 constituting the diode anodes and having out of phase voltages thereon as represented by the curves 43 and 44 (see Fig. 5).

Inasmuch as these grids vary in potential by amounts which are proportional to the division of the alternating current input voltage by the unidirectional input voltage, they act to control the plate current in the tubes 51 and 52 in the same manner but increased in amplitude in accordance with the amplification factor of these tubes. Furthermore, since the plates 66 and 67 are connected to a source of positive voltage through resistors 68 and 69, their potentials will fluctuate in accordance with the amplified potentials applied to the grids 53 and 54 and the alternating voltage output derived through condensers 71 and 72 constitutes a voltage which is proportional to the quotient of the alternating and unidirectional input voltages.

In the arrangement of Fig. 3 the diode effect of the grids 53 and 54 as heretofore described in connection with the circuit of Fig. 1, is not impaired by the space current flow to the plates 66 and 67 and the amplifying action is such that outputs as high as 6 volts r. m. s. have been obtained with very little distortion.

While the system has been described in its essence as a means for dividing an alternating current voltage by a unidirectional or direct current voltage, it will be obvious to those skilled in the art that a direct current voltage may be divided by another direct current voltage or an alternating current voltage by another alternating current voltage or the quotient of any combination of such voltages may be obtained by merely converting the voltages if necessary before impressing them on the system. Likewise the quotient output alternating voltage may be converted to a direct current voltage if desired.

What is claimed is:

1. In a voltage dividing circuit for dividing a first voltage by a second voltage, an attenuating circuit comprising a high resistance and a thermionic tube having at least a cathode and electron collecting electrode connected in series, means for impressing an alternating current voltage representative of said first voltage and a unidirectional voltage representative of said second voltage across said alternating circuit, and means coupled to said electron collecting electrode for deriving an alternating output voltage which is proportional to the voltage existing between said cathode and electron collecting electrode.

2. A voltage dividing circuit according to claim 1 in which the means for deriving an alternating current output voltage which is proportional to the voltage existing between said cathode and electron collecting electrode comprises a capacitive coupling connected to said electron collecting electrode.

3. A voltage dividing circuit according to claim 1 in which the means for deriving an alternating output voltage which is proportional to the voltage existing between said cathode and electron collecting electrode, comprises an anode connected in circuit with said cathode, said electron collecting electrode being in the form of a grid whereby the flow of current between said anode and said cathode is controlled by the potential of said electron collecting electrode.

4. In a voltage dividing circuit for dividing an alternating current voltage by a unidirectional voltage, an attenuator circuit comprising a first resistance element, a second resistance element connected in series therewith said second resistance element having the characteristic that the current flowing therethrough is an exponential function of the potential impressed thereon, circuit means for impressing said alternating current voltage and said unidirectional voltage across said attenuating circuit and other circuit means coupled to said second resistance element for deriving an alternating voltage from the potential existing across said second resistance element.

5. In a voltage dividing circuit for dividing an alternating current voltage by a unidirectional voltage, a first high resistance, a first tube section having at least a cathode and an electron collecting electrode connected to one end of said first resistance forming a first attenuator circuit, a second high resistance, a second tube section having at least a cathode and an electron collecting electrode connected to one end of said second resistance forming a second attenuator circuit, a transformer the secondary of which has its opposite ends connected respectively to the ends of said first and second resistances remote from said first and second tube sections, circuit means for applying said alternating current voltage to the transformer primary, circuit means for applying said unidirectional voltage in parallel to said first and second attenuator circuits, comprising a pair of input terminals therefore, a connection between one of said input terminals and a midtap on said transformer secondary and a common connection between the other of said input terminals and the cathodes of said tube sections and means coupled to said first and second tube sections for deriving an alternating output voltage which is proportional to the algebraic difference of the electron collecting electrode potentials of said tube sections.

6. In a voltage dividing circuit for dividing an alternating current voltage by a unidirectional voltage, a first discharge tube having at least a cathode, grid and anode electrodes, a second discharge tube having at least a cathode, grid and anode electrodes, a circuit common to said cathodes, an alternating voltage input circuit for said tubes comprising a transformer having a secondary one end of which is connected to the grid electrode of said first tube through a first high resistance and the other end of which is connected to the grid electrode of said second tube through a second high resistance, the magnitude of said first and second high resistances being great as compared with the impedance existing between said grid electrodes and said cathodes, a unidirectional input circuit for said tubes comprising a first input terminal connected to a midtap on said transformer secondary and a second terminal connected to said common cathode circuit whereby said high resistances and the grid-cathode sections of said tubes constitute a pair of attenuator circuits for said alternating and unidirectional input voltages and means for procuring an amplified alternating voltage which is proportional to the algebraic difference of the grid potentials comprising capacitive connections to the plate electrodes of said first and second tubes.

7. A voltage dividing circuit according to claim 6 in which said first and second discharge tubes are high-mu triodes.

8. In a voltage dividing circuit for dividing an alternating current voltage by a unidirectional voltage, a first attenuator comprising a first tube section having at least a cathode and electron collecting electrode and a first high resistance connected in series, a second attenuator circuit comprising a second tube section having at least a cathode and electron collecting electrode and a second high resistance connected in series, said cathodes being connected together and to a terminal of reference potential, circuit means connected to the inputs of said first and second attenuator circuits for applying said alternating current voltage thereto in phase opposition, circuit means for applying said unidirectional voltage across each of said attenuator circuits, and means coupled to said first and second tube sections for deriving from the electron stream between said cathodes and electron collecting electrodes an alternating output voltage which is proportional to the algebraic difference of their electron collecting electrode potentials.

JOHN W. GRAY.

REFERENCES CITED

The following references are of record in the file of this patent:

UNITED STATES PATENTS

| Number | Name | Date |
|---|---|---|
| 2,244,369 | Martin | June 3, 1941 |
| 2,471,835 | Norgaard | May 31, 1949 |
| 2,487,603 | Scoles | Nov. 8, 1949 |